E. Buel.

No. 44,696. Churn. Patented Oct. 11, 1864.

Witnesses:
Dan'l D. Davidson
Elijah F. Bock

Inventor,
Ebenezer Buel

UNITED STATES PATENT OFFICE.

EBENEZER BUEL, OF SHERIDAN, NEW YORK.

IMPROVEMENT IN CHURNS.

Specification forming part of Letters Patent No. 44,595, dated October 11, 1864.

*To all whom it may concern:*

Be it known that I, EBENEZER BUEL, of the town of Sheridan, in the county of Chautauqua and State of New York, have invented a new and Improved Churn; and I do declare the following to be a full and exact description thereof, reference being had to the accompanying drawings, and to the letters marked thereon, forming part of this specification.

To enable others skilled in the art to make and use my invention, I will proceed to describe its construction and operation.

Figure 1:
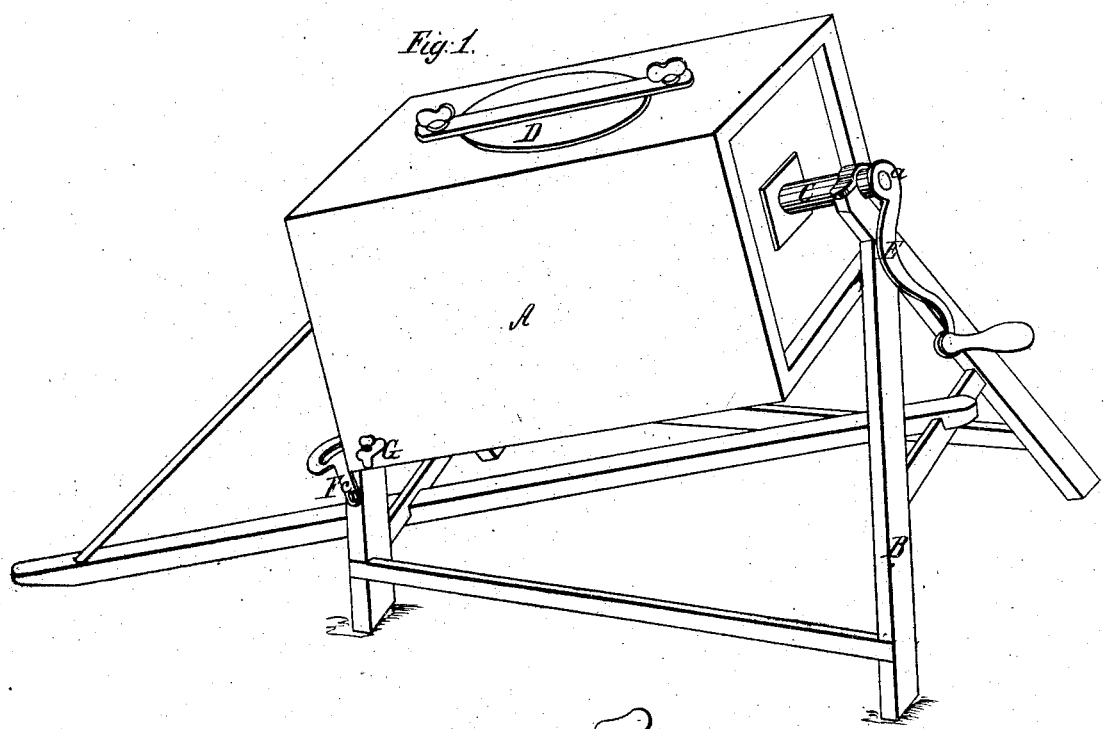
Figure 2:
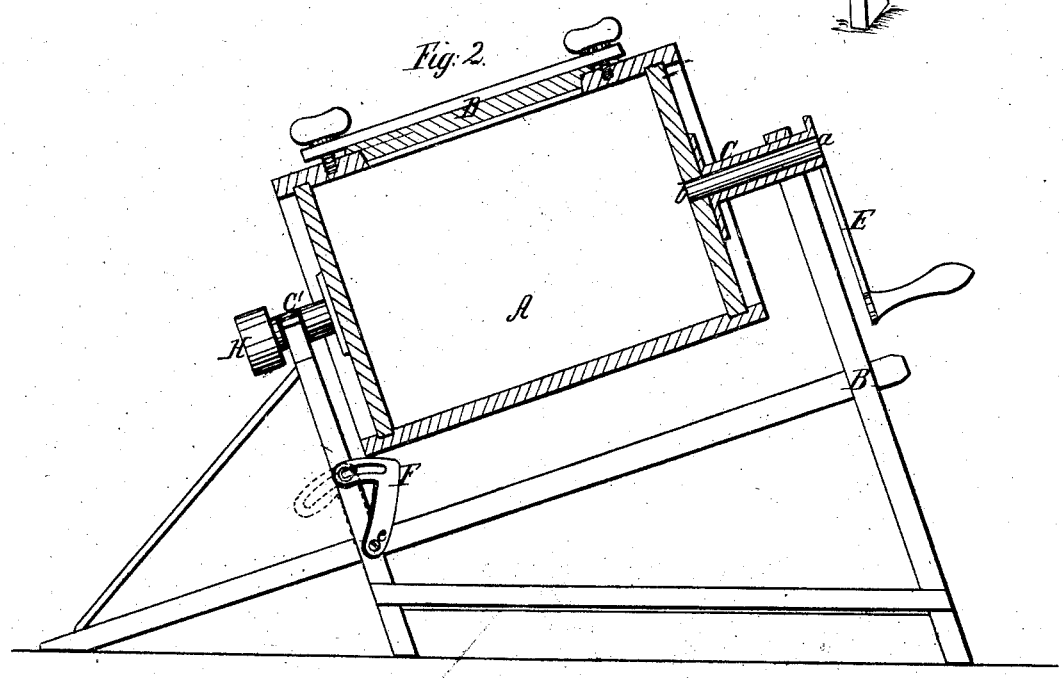

Figure 1 is a perspective view of my improved churn. Fig. 2 is a longitudinal elevation of the frame and sectional view of the box or body, showing the angle of inclination and position of the parts.

Letters of reference in the specification refer to like parts in the drawings.

This invention relates to that class of farming or dairying implements denominated the "atmospheric churn," having for its advantages over other churns of that class cheapness, simplicity, durability, and ease of operation.

A represents a box of a rectangular form, made of either wood or metal, and of any suitable capacity to suit the convenience of the operator. The box A, or body of the churn, is hung upon journals secured to the ends of the body of the churn by flanges or other suitable means, as shown in the drawings.

B is the frame, and may be constructed in any convenient shape, and of either wood or metal, but for cheapness and convenience I prefer to construct it of wood in the manner shown in the drawings accompanying this specification at Figs. 1 and 2, constructing the frame in such a manner that when the body or box is hung in its position its axis shall have an inclination of about fifteen degrees, although I do not confine myself to this particular degree, as it may be varied slightly without changing the essential features of my invention. The object of this inclination is two-fold—viz., first, it prevents the agitated milk or cream from flowing out at the orifice of the opening in the hollow journal, as seen at *a*, Figs. 1 and 2; and, secondly, it promotes a better separation of the "follicles" of butter from the milk by a more effectual breakage in the currents.

C and C' are journals upon which the body of the churn rotates, C being hollow. This hollow extending throughout the whole length of the journal and communicating with the chamber of the churn by means of an aperture in the end of the box, as exhibited in Fig. 2 at *b*, admits the free passage of air to the cavity and in contact with the mass of cream or milk, and forms an essential feature of my invention, it having been fully demonstrated to the satisfaction of all first-class dairymen that ventilation during the process of churning is indispensable to the production of good butter.

D is the cover or lid, which may be secured in any of the well-known forms, either with thumb-screws or otherwise, so that it may be easily removed for the purpose of putting the milk or cream into the churn and for removing the butter and cleansing the churn.

E is a crank, secured to the journal C, by means of which the churn is operated.

F F are brackets or rests, and are adjustable, as shown in the drawings in different positions in Figs. 1 and 2 and by the red lines in Fig. 2, moving on pivots at the lower ends, as seen at *c*. This is for the purpose of giving a firm support to the churn in an upright position when desirable for any purpose.

G is a faucet, at which the buttermilk or whey or any other liquid may be drawn off.

H is a pulley, secured to the lower journal, by means of which power may be attached when desirable.

The operation of my improved churn is simple and requires but a small amount of power to operate it, as only about forty to sixty revolutions per minute should be given to it, the operation of changing or separating the follicles or sacks of butter from the milk depending on the agitation of the mass by the peculiar form of my churn when made to rotate at about the velocity above indicated. The inner surfaces being smooth, and having neither beaters or ledges, it will be seen the operation consists in the flow of the cream or milk from side to bottom and from angle to angle as a rotary motion is given to the churn, by which means a separation of the butter is made from the milk without bursting the sacks that contain the "globules," and leaving butter and not grease, as when beaters, ledges, and violent means are used, as in many of the churns in common use.

Having thus fully described the nature of my invention and its operation, what I desire to secure by Letters Patent of the United States is—

1. In combination with the brackets F, a rectangular-shaped churn, with a hollow journal, for the purpose of admitting air into the cavity of the churn, the churn having an inclination upon its axis, the several parts being constructed, arranged, and operating as specified.

2. In combination with the churn A, and the frame B, the brackets F F, when constructed and used for the purposes set forth.

EBENEZER BUEL.

Witnesses:
 DANL. D. DAVIDSON,
 ELIJAH F. BRECK.